United States Patent Office 3,832,240
Patented Aug. 27, 1974

3,832,240
PRODUCTION OF EXTENDIBLE RODS
Moritada Kubo, Tokyo-to, and Yasuo Nogiwa, Yokohama, Japan, assignors to Tokyo Shibaura Denki Kabushiki Kaisha, Kanagawa-ken, Japan
Filed Aug. 2, 1971, Ser. No. 168,217
Claims priority, application Japan, Aug. 1, 1970, 45/67,586, 45/67,587
Int. Cl. C22f 1/08
U.S. Cl. 148—11.5 R                            7 Claims

ABSTRACT OF THE DISCLOSURE

A ribbon foil spring material protected by a layer of a reinforcing material is passed through an inlet die and through an annular heat treatment passageway formed between a cylinder and a mandrel disposed therewithin, the cylinder being disposed within a furnace, thereby to deform plastically the foil spring material into a tubular shape and to harden the same permanently as wrinkling thereof is prevented by the reinforcing material, which is finally burned and dispersed in the heat-treatment passageway.

BACKGROUND

This invention relates generally to techniques in forming metals into shaped structures and more particularly to a new and advanced method for producing spring-strip, extendible rods which are made of thin foil strips of spring material, such as beryllium copper (Be-Cu) and Phosphor bronze, and can assume an elastically deformed state as rolls of the strips, which upon being unrolled and extended assume a stable state as tubes of thin rod shape without formation of wrinkles.

Extendible rods presently used for articles such as antennas for man-made satellites are stored in the compact form of a wound roll when not in use in a place of limited space. Then, at the time of use, one end of this extendible rod is merely grasped and extended to form a tubular structure of thin rod shape.

Heretofore, extendible rods of this type have been lengthened by spot welding on additional lengths in applications where rods as long as several tens of meters, as in the case of some antennas, are required.

However, since the material of which an extendible rod is made is a very thin foil material of a thickness less than 0.1 mm., for example, deformations and wrinkles are easily formed during the production process, whereby there has heretofore been a high possibility of producing extendible rods of defective product quality.

Furthermore, the work of welding these extendible rods has been extremely difficult. On one hand, moreover, the method which comprises mill rolling the spring material, forming the material into the required free form of an extendible rod, and heat treating the material to impart spring property thereto is known as one method of producing extendible rods of spring materials. This method, however, not only requires a large plant but also involves complicated facilities, and entails difficulties in producing the extendible rods at low cost.

SUMMARY

It is an object of this invention to provide a simple and low-cost method for producing extendible rods without the accompaniment of the above described difficulties.

According to this invention, briefly summarized, there is provided a method for producing extendible rods without wrinkles which comprises preparing a foil material of ribbon form by bonding a reinforcing material on one or both surfaces of a foil spring material and passing the foil material thus prepared slowly through an inlet die and through a heat treatment passageway formed between a cylinder and a mandrel disposed coaxially therewithin, the cylinder being disposed within a furnace, thereby to deform plastically the foil spring material into a tubular shape and to permanently set the same as wrinkling thereof is prevented by the reinforcing material, which is ultimately burned off in the heat-treatment passage.

According to another aspect thereof, there is provided an apparatus for producing extendible rods according to the above described method, the apparatus comprising the inlet die and heat-treatment passageway within the furnace as mentioned above, means for feeding and guiding the foil material into the inlet die, an outlet die for elastically opening the tubular foil material toward a flat shape, flattening means for further flattening the foil material elastically, and take-up means for taking up the flattened foil material.

The nature, principles, and utility of this invention will be apparent from the following detailed description of the invention with respect to examples of preferred embodiment thereof when read in conjunction with the accompanying drawings, in which like parts are designated by like reference numerals.

DETAILED DESCRIPTION

Figure 2:
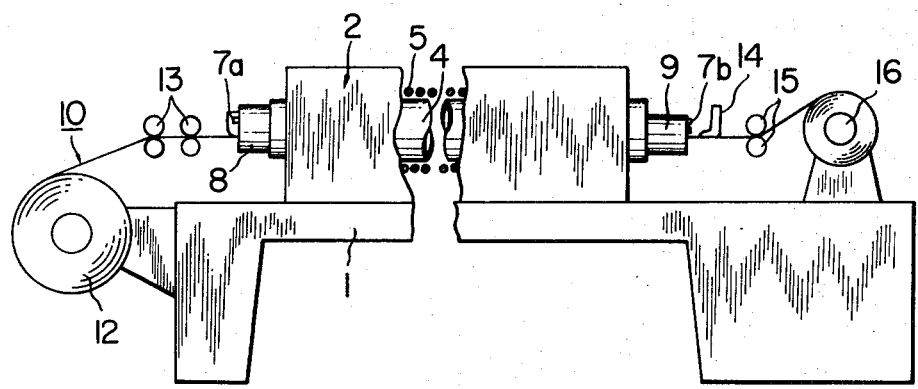
FIG. 2 is a side elevation, with a middle portion broken away for foreshortening the view, showing an example of apparatus accoring to this invention for producing extendible rods.
Figure 3:
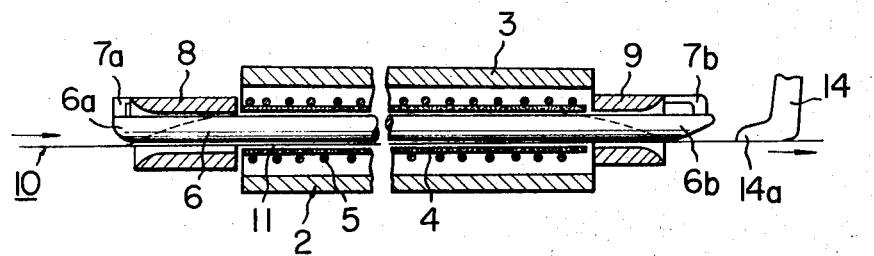
FIG. 3 is a relatively enlarged elevation, with a middle portion broken away for foreshortening and with parts in longitudinal (vertical section) showing essential processing parts of the apparatus shown in FIG. 2.
Figure 4:
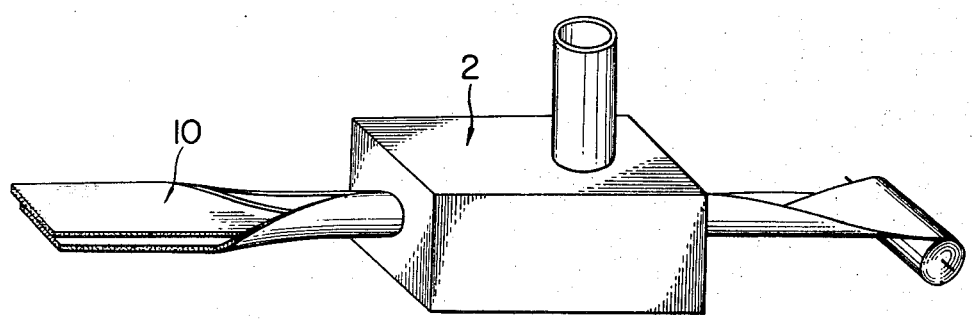
FIG. 4 is a perspective view diagrammatically indicating the method of producing extendible rods according to this invention.

Referring first to FIGS. 2 and 3, the method of this invention can be effectively practiced by means of apparatus as illustrated therein. The essential parts of this apparatus are mounted on a horizontal base structure 1, which supports at its middle part a heat-treatment furnace 2.

This furnace 2 comprises essentially an outer cylinder 3, an inner cylinder 4 disposed coaxially therewithin, and a heater coil 5 of helical shape disposed coaxially between the outer and inner cylinders 3 and 4. This furnace 2 is not limited in construction to that illustrated by way of example, but may be of any suitable organization provided that it is capable of heating the extendible rod material to the required temperature.

Within the inner cylinder 4 of the furnace 2 there is coaxially disposed a mandrel 6 of round-bar shape with a slight annular gap or clearance between it and the inner surface of the inner cylinder 4, this gap constituting a heat-treatment passageway 11. The ends 6a and 6b of this mandrel 6 extend outward beyond the extremities of the inner cylinder 4, and are secured by mounting members 7a and 7b to the outer upper lips of an inlet die 8 and an outlet die 9. The inner base or root parts of the inlet and outlet dies 8 and 9 are detachably and coaxially secured to the open ends of the inner cylinder 4.

The inner surfaces of the inlet and outlet dies 8 and 9 are flared outwardly and are of circular cross section at their inner ends. The annular gap or clearance between the inner surface of the dies 8 and 9 and the outer surface of the mandrel 6 is never less than the thickness of the foil material 10 for forming the extendible rod. That is, the gap between the inlet die 8 and the mandrel 6 forms a material-working passageway for shaping the foil material 10 by plastic deformation into a thin tubular structure.

At a position upstream from the inlet die 8, there is rotatably supported a material supply reel 12 supporting the foil material 10 wound thereabout in roll form. The free, leading end of this foil material 10 is passed between guide rollers 13 and fed into the inlet die 8 in a manner to prevent wrinkling of the material. Further features of this apparatus are described hereinafter.

Figure 5:
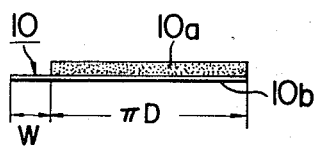
FIG. 5 is an enlarged cross section of an example of composite materials to be formed into an extendible rod according to the invention.
Figure 6:
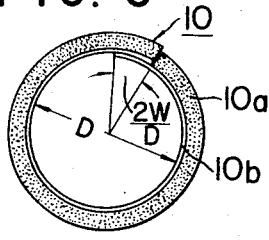
FIG. 6 is an enlarged cross section of an extendible rod in its free extended state formed when the materials shown in FIG. 5 are rounded or wrapped about an axis parallel to the longitudinal direction of the materials.

In accordance with the method of this invention, the foil material 10 comprises a spring material 10b and a reinforcing material 10a of combustion dispersion characteristic, such as a synthetic resin, for example, as shown in FIG. 5. This reinforcing material 10a is made narrower by a width distance W than the width ($\pi D+W$) of the spring material 10b. Accordingly, when the foil material 10 is rounded into a tubular structure as indicated in FIG. 6, the angle at the centerline of the structure which subtends the part W is $2W/D$ radian.

That is, by laying a reinforcing material 10a of a width of $\pi D$ on the spring material 10b of the foil material 10 and leaving exposed a part of the spring material of a width W, the foil material can be rounded into a tubular structure with a lapped part by means of the inlet die 8. Therefore, when the tubular structure thus formed is passed through the heat-treatment passageway 11, and the reinforcing material is burnt and dispersed, there is no possibility of dimensional error in the outer diameter of the extendible rod and of formation of wrinkles on the surface of the foil material 10.

The reinforcing material 10a is not limited to synthetic resins, any reinforcing material being suitable provided that it fulfills the two requirements of preventing wrinkling of the spring material 10b and of completely burning and dispersing within the heat-treatment passageway 11.

Figure 1:
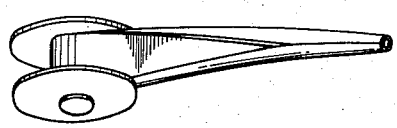
FIG. 1 is a perspective view showing an example of an extendible rod produced by the method and apparatus of this invention.

On one hand, the resulting foil spring material 10b which passes out through the outlet die 9, while it has been plastically and permanently, deformed into an extendible rod as indicated in FIG. 1, is again pressed and uncurled elastically into a flat shape by a flatiron-like member 14. The member 14 is fixedly supported by a suitable stationary part (not shown) of the apparatus and has a leading end 14a of a flatiron shape, which forces the extendible rod into a flat state.

Downstream from the flatiron member 14, there are provided a pair of guide rollers 15 and a take-up reel 14, which takes up as a roll the extendible rod thus flattened.

Thus, by feeding the free end of the foil material 10 wound as a roll on the supply reel 12 through two pairs of rollers 13 and into the inlet die 8, this foil material 10 is plastically deformed into the form of a thin rod. Then, as this tubular rod structure is passed through the heat-treatment passageway 11 of the furnace 2, the reinforcing material 10a bonded onto the spring material 10b to prevent wrinkling is burned and dispersed.

The traveling speed of the foil material 10 in the above described operation is determined by the length of the heat-treatment furnace 2 and time required for the heat treatment. Accordingly, in the case of a foil material of beryllium copper, the material is hardened uniformly without irregularity for approximately from 1 to 3 hours at a temperature of from 600 to 650° F.

As the foil material 10 is passed at the above indicated traveling speed through the heat-treatment passageway 11, it is hardened uniformly, and, at the same time, the reinforcing material 10a is burned and dispersed, and the spring material is transformed into an extendible rod of straight form in the longitudinal direction of the material.

While this tubular structure is extended by the outlet die 9 and pressed open and flattened into a ribbon state by the flatiron-like member 14, it is in an elastically deformed state. Accordingly, if this flattened material is extended in a free state, it will return to its natural state as an extendible rod.

The diameters of the inner cylinder 4 and mandrel 6 disposed within the furnace 2 are determined by the specified diameter of the extendible rod. More specifically, the inner diameter of the inner cylinder 4 is made substantially equal to the required outer diameter of the extendible rod, while the outer diameter of the mandrel 6 is made substantially equal to the required inner diameter of the rod. Through the heat-treatment passageway 11 formed according to these dimensions, the foil material 10 with the reinforcing material 10a adhering thereto can be passed as it is curved into a tubular structure by the inlet die 8.

The shape of the inner surface of the inlet and outlet dies 8 and 9 is generally a conical curve surface with some flare. Precisely stated, however, it is desirable that the curved surfaces of the dies 8 and 9 be determined by the states of the two ends of the material supported and tensioned in flat shape by the take-up roll when the middle part of the foil material is maintained in tubular shape, the inlet die 8 and the outlet die 9 respectively contacting the foil material from the outer side and the inner side.

Figure 7:
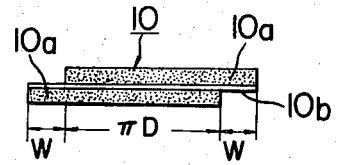
FIG. 7 is an enlarged cross section of another example of composition materials to be formed into an extendible rod according to the invention.
Figure 8:
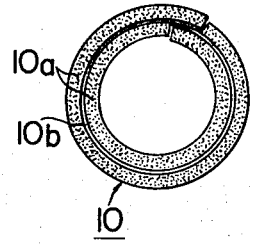
FIG. 8 is an enlarged cross section of an extendible rod in its free extended state formed when the materials shown in FIG. 7 are rounded or wrapped about the longitudinal axis.

The stock material for the extendible rod of this invention as shown in FIGS. 7 and 8 comprises a foil spring material 10b and layers of reinforcing material 10a bonded onto respectively opposite surfaces of the spring material 10b, except for exposed areas each of width W left on each surface. In the effectiveness in preventing wrinkles in the foil material 10 prior to heat treatment and shaping, this foil material illustrated in FIGS. 7 and 8 is substantially equal to that described hereinabove with reference to FIGS. 5 and 6.

Thus, by the practice of this invention, not only is wrinkling of the extendible rod material prevented, but oxidation of the same is also prevented. Moreover, since the reinforcing material is burned off during the heat treatment, taking up of the rod material after processing is facilitated.

From the foregoing disclosure, furthermore, it will be apparent that the method and apparatus according to this invention are extremely simple and inexpensive.

We claim:

1. A method for producing extendible rods comprising the steps of bonding a reinforcing material of combustion dispersion characteristic on at least one surface of a foil spring material in ribbon form to prepare a composite foil material, feeding the composite foil material through a die to deform it plastically into a tubular shape with the reinforcing material disposed on the radially outer side of the foil spring material to prevent wrinkling of the same, advancing the composite tubular foil material through a heat-treatment furnace at a predetermined rate of travel and temperature to permanently set the deformed tubular shape of the foil spring material and to burn and disperse the reinforcing material, and feeding the heat-treated foil spring material out of the furnace.

2. The method as claimed in claim 1 wherein the tubular composite foil material is advanced through the heat-treatment furnace while being confined within a cylinder having an inner diameter substantially equal to the outer diameter of the tubular composite foil material being advanced.

3. The method as claimed in claim 2 wherein the tubular composite foil material is advanced through the heat-treatment furnace around a mandrel coaxially provided within said cylinder.

4. The method as claimed in claim 1 wherein said reinforcing material of combustion dispersion characteristics is a synthetic resin.

5. The method as claimed in claim 1 wherein the transverse width of the spring material is greater than that of the reinforcing material by a specified length.

6. The method as claimed in claim 1, further including the step of passing the heat-treated tubular foil spring, which has been fed out of the heat-treatment furnace, through an outlet die to flatten the same.

7. The method of claim 6 wherein said composite foil material is fed from a reel and guided on its way to said deforming die and heat-treatment furnace and wherein the heat-treated tubular foil spring which is fed out of said furnace through said outlet die is further flattened by an iron-like member and then wound on to a take-up storage reel.

References Cited
UNITED STATES PATENTS 3,655,460    4/1972    Hayden et al. _____ 148—13.1
3,342,648    9/1967    Zucker et al. _____ 148—11.5 F RICHARD O. DEAN, Primary Examiner U.S. Cl. X.R.

148—13.1, 13.2